(12) United States Patent
Tin

(10) Patent No.: US 7,860,304 B2
(45) Date of Patent: Dec. 28, 2010

(54) CONSTRUCTING BASIS FUNCTIONS USING SENSOR WAVELENGTH DEPENDENCE

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1051 days.

(21) Appl. No.: 11/609,280

(22) Filed: Dec. 11, 2006

(65) Prior Publication Data

US 2008/0137941 A1 Jun. 12, 2008

(51) Int. Cl.
G06K 9/00 (2006.01)
(52) U.S. Cl. .................................................. 382/162
(58) Field of Classification Search .................. 382/162
See application file for complete search history.

(56) References Cited

U.S. PATENT DOCUMENTS

| | | | | |
|---|---|---|---|---|
| 4,992,963 | A | 2/1991 | Funt et al. | |
| 5,490,516 | A * | 2/1996 | Hutson | 600/508 |
| 6,654,055 | B1 | 11/2003 | Park et al. | 348/242 |
| 6,862,073 | B2 * | 3/2005 | Kashima | 349/194 |
| 6,952,494 | B2 | 10/2005 | Odagiri et al. | 358/1.9 |
| 7,064,769 | B2 | 6/2006 | Speigle et al. | |
| 7,710,432 | B2 * | 5/2010 | Edge | 345/589 |
| 2003/0185438 | A1* | 10/2003 | Osawa et al. | 382/162 |
| 2003/0193669 | A1* | 10/2003 | Takagi | 356/446 |
| 2004/0174433 | A1 | 9/2004 | Uchino | 348/207.99 |
| 2006/0007458 | A1* | 1/2006 | Hardy | 358/1.9 |
| 2006/0221341 | A1* | 10/2006 | Paul et al. | 356/406 |

OTHER PUBLICATIONS

Y. Zhu, S.J. Gortler and D. Thurston, "Sensor Network Localization Using Sensor Perturbation," Short version appears in INFOCOM 2009 (minicoference).*

Laurence T. Maloney, et al., "Color constancy: a method for recovering surface spectral reflectance", Optical Society of America, Jan. 1986, p. 29-33, vol. 3—No. 1; Stanford, CA.

Joyce E. Farrell, et al., "Estimating Spectral Reflectances of Digital Artwork", Hewlett-Packard Laboratories, pp. 1-7.

Q. Chen, et al., "Physical modelling of spectral reflectance", AIC Colour 5-10th Congress of the International Colour Association, Centre for Colour Design Technology, pp. 1151-1154.

Shoji Tominaga, et al., "Component estimation of surface spectral reflectance", Journal of the Optical Society of America, vol. 7, No. 2, pp. 312-317 (1990).

(Continued)

*Primary Examiner*—John B Strege
*Assistant Examiner*—Nirav G Patel
(74) *Attorney, Agent, or Firm*—Fitzpatrick, Cella, Harper & Scinto

(57) ABSTRACT

Generation of basis functions for spectral reflectances of color samples is provided. Reflectance information of the color samples is input, the reflectance information is weighted with a weighting function based on a wavelength dependence of an optical sensor, and the weighted information is analyzed to obtain the basis functions. Basis functions for illuminants are generated by inputting reflectance and associated information of the color samples, inputting illuminant information, constructing a matrix of weighted tristimulus values, and analyzing the matrix to obtain the basis functions. A weighting function for an optical sensor is generated by inputting a first weighting function, based on transformation of a reflectance perturbation from a reflectance space into a color space of the sensor, calculating the first weighting function with predetermined stimuli to obtain a plurality of resulting functions, and averaging the resulting functions to obtain the weighting function for the sensor.

12 Claims, 11 Drawing Sheets

OTHER PUBLICATIONS

J. B. Martinkauppi, et al., "Basis Functions of the Color Signal of Skin under Different Illuminants", 4 pages.

A. Kimball Romney, et al., "Munsell Reflectance Spectra Represented in Three-Dimensional Euclidean Space", Color research and application, vol. 28, No. 3, pp. 182-196, (2003).

Werner Praefcke, et al., "Optimized Basis Functions for Coding Reflectance Spectra Minimizing the Visual Color Difference", pp. 1-4 (Reprint from Proc. IS&T/SID 3rd Color Imaging Conference, pp. 37-40, Scottsdale, Arizona, USA, Nov. 1995).

"Spectra Databases", available at http://www.it.lut.fi/ip/research/color/database/database.html.

* cited by examiner

CONSTRUCTING BASIS FUNCTIONS USING SENSOR WAVELENGTH DEPENDENCE

BACKGROUND OF THE INVENTION

1. Field of the Invention

This invention pertains to the construction of basis functions. Specifically, the invention relates to constructing basis functions for spectral reflectances and illuminants based on a wavelength dependence of an optical sensor.

2. Related Background Art

Many present-day applications utilize information about the spectral characteristics of objects and illuminants. For example, computer aided design/computer aided manufacturing (CAD/CAM) applications, multi-spectral image capture devices, and spectral color-matching applications can rely on spectral data to capture, process, store and render images. While the use of spectral data can provide many advantages, such as reducing metamerism, using spectral data presents some obstacles.

In particular, accurately representing the spectral characteristics of a single object or illuminant typically requires a large number of data samplings over a range of wavelengths. In other words, the dimensionality of the data is high. Moreover, the amount of data required increases significantly when a large number of objects and/or illuminants are used in an application. Storing, manipulating, or simply moving this large amount of data results in increased memory requirements and decreased computational performance.

A well-known approach to this problem is the construction of basis functions, which allow the application to generate approximations of the spectral characteristics of an object or illuminant. In one advantage, the construction of basis functions allows the effective dimension of the data to be reduced, which can result in a memory savings and a corresponding boost in computational performance. However, while the basis functions constructed by present day methods can provide a model of an object's spectral characteristics, the model does not necessarily correlate well with the perception of a particular sensor, such as human visual perception.

SUMMARY OF INVENTION

To address the foregoing, the present invention constructs basis functions for spectral reflectances and illuminants based on a wavelength dependence of a predetermined optical sensor, such as the human eye. In this way, for example, the invention can take into account the particular wavelength characteristics of the sensor in the construction of the basis functions. Consequently, the invention can result in a smaller set of basis functions, hence lower dimensionality, that still maintain a high accuracy across a wide variety of illuminants. One way in which the invention provides these advantages in generating basis functions for spectral reflectances of a plurality of color samples is by inputting reflectance information of the color samples, weighting the reflectance information with a weighting function based on a wavelength dependence of a predetermined optical sensor, and analyzing the weighted reflectance information to obtain the basis functions. The weighting function can be based on, for example, a wavelength dependence of human vision.

In one aspect of the invention, the reflectance information comprises a matrix of reflectance values of the color samples at predetermined wavelengths, and weighting the reflectance information comprises multiplying the reflectance values with corresponding values of the weighting function at the predetermined wavelengths.

In another aspect of the invention, analyzing the weighted reflectance information comprises performing singular value decomposition on the weighted reflectance information to obtain a plurality of singular vectors, selecting a subset of singular vectors having the highest corresponding singular values of the plurality of the singular vectors, and modifying the singular vectors of the subset to compensate for the weighting of the reflectance information.

The invention can also include setting a basis dimension number based on a constraint of a processor design such as a natively-supported matrix operation in a particular dimension. In this case, the number of singular vectors in the subset corresponds to the basis dimension number.

Moreover, coefficients of a spectral reflectance vector can be calculated corresponding to plurality of these basis functions by calculating a weighted dot product of the spectral reflectance vector and a basis function. In this case, the dot product is weighted based on the weighting function.

Another way the invention provides the foregoing advantages in generating basis functions for a plurality of illuminants, is by inputting reflectance information and associated information of predetermined basis functions for spectral reflectances of a plurality of color samples, inputting illuminant information of a predetermined subset of a plurality of predetermined illuminants, constructing a matrix of weighted tristimulus values from the reflectance and associated information and the illuminant information, and analyzing the matrix of weighted tristimulus values to obtain the basis functions.

In another aspect of the invention, the reflectance information comprises reflectance basis vectors, the associated information comprises relative weights of the reflectance basis vectors. In this case, constructing the matrix can comprise transforming, for each reflectance basis vector, the illuminant information into a color space of a predetermined optical sensor to obtain raw tristimulus values, and weighting the raw tristimulus values based on the relative weights of the corresponding reflectance basis vector to obtain the weighted tristimulus values.

In another aspect of the invention, analyzing the matrix of weighted tristimulus values comprises performing singular value decomposition on the matrix of weighted tristimulus values to obtain a plurality of singular vectors, selecting a subset of singular vectors having the highest corresponding singular values of the plurality of the singular vectors, and modifying the singular vectors of the subset to compensate for the weighting of the raw tristimulus values.

The invention can also take advantage of the fact that many graphics processing units (GPUs) provide native support for matrix operations of a particular dimension. In this case, a basis dimension number can be set based on the particular dimension. The number of singular vectors in the subset corresponds to the basis dimension number.

Another way the invention provides the foregoing advantages in generating a weighting function for an optical sensor is by inputting a first weighting function, which is based on a transformation of a reflectance perturbation from a reflectance space into a color space of the sensor, calculating the first weighting function with a plurality of predetermined stimuli to obtain a corresponding plurality of resulting functions, and averaging the resulting functions to obtain the weighting function for the sensor.

The first weighting function can be obtained, for example, by defining a perturbation of a reflectance vector of a stimulus in a reflectance space, transforming the perturbation into a color space of the sensor, wherein the transformed perturbation corresponds to a color difference between an unperturbed reflectance vector and a perturbed reflectance vector in the color space of the sensor, and determining the first weighting function by taking the limit of the transformed perturbation as the perturbation approaches zero. The operation of taking the limit as the perturbation approaches zero can be approximated by using a perturbation that is sufficiently small, as in finite difference approximation of differentiation.

In another aspect of the invention, transforming the perturbation is based on a spectrally flat illuminant. This can, for example, allow for an illuminant-independent set of basis functions. In addition, the color space of the sensor can be a uniform color space of the sensor, which can allow the resulting basis functions to better correlate to the response of the sensor. For example, the sensor can be the human eye, and the color space can be a perceptually linear color space for human vision.

In another aspect of the invention, transforming the perturbation into a color space of the sensor comprises calculating tristimulus values of the perturbation, and transforming the tristimulus values into a linear color space of the sensor.

The invention can also include constructing the predetermined stimuli. In this case, constructing the predetermined stimuli can comprise sampling the color space of the sensor under a spectrally flat illuminant, within a gamut of the sensor.

The invention may be embodied, for example, in a method, apparatus, computer-readable storage medium storing computer-executable process steps, or computer-executable process steps existing in any form that can impart functionality when employed as a computer component.

The invention also includes the resulting basis functions and weighting functions generated according to the methods, apparatuses and computer process steps of the invention. In particular, when stored on computer-readable medium, or comparable form, the basis functions and weighting functions of the invention are data structures, which can impart functionality when employed as computer components.

This brief summary has been provided so that the nature of the invention may be understood quickly. A more complete understanding of the invention can be obtained by reference to the following detailed description in connection with the attached drawings.

DRAWINGS

DETAILED DESCRIPTION OF THE PREFERRED EMBODIMENTS

Figure 1:
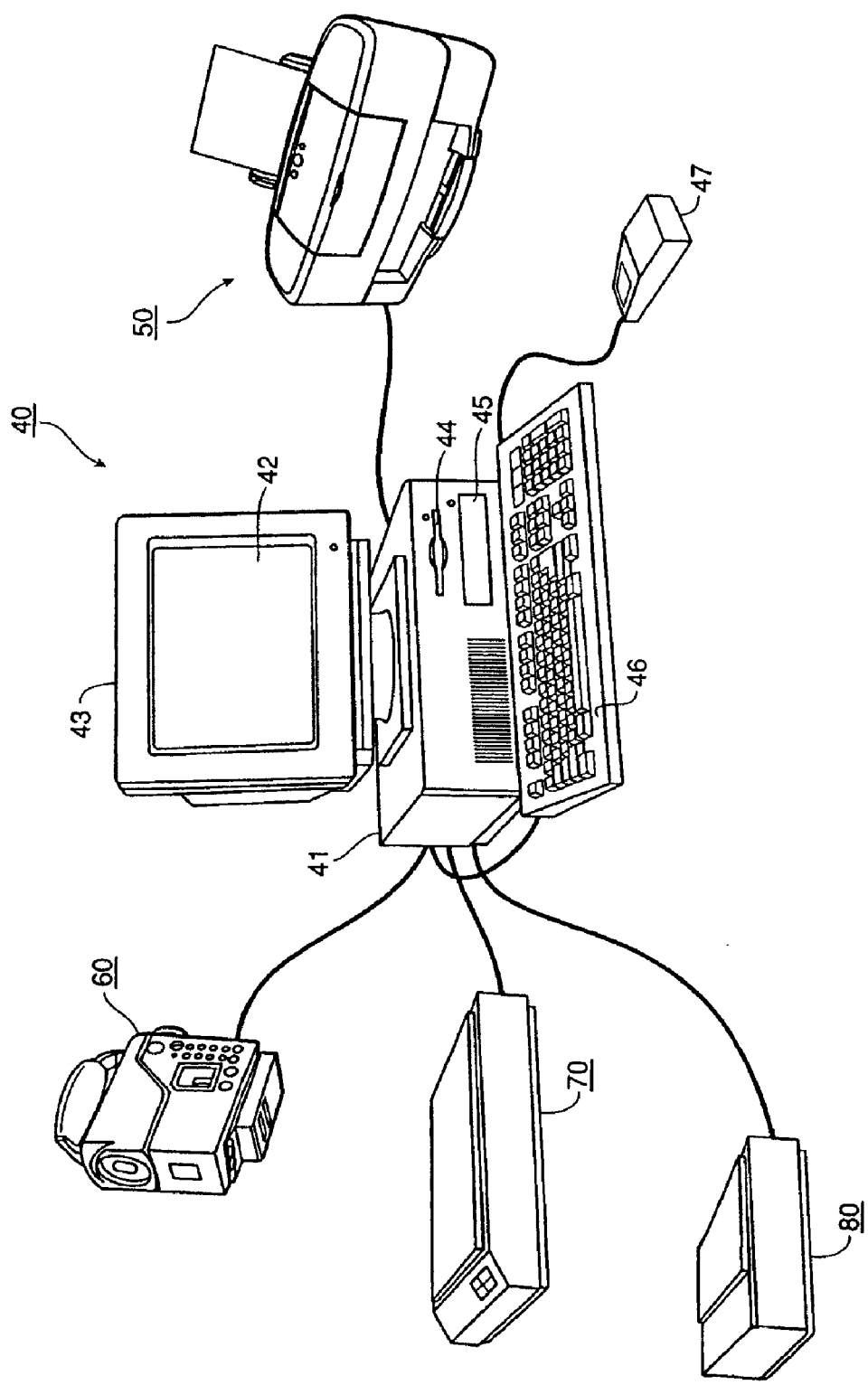
FIG. 1 is a perspective view of an exemplary computing environment in which the present invention may be implemented.

The present invention is generally directed to constructing basis functions for spectral reflectances and illuminants based on a wavelength dependence of an optical sensor. Basis functions constructed in this manner can often provide for more optimal modeling of the spectral reflectances and illuminants, particularly in wavelength regions in which the sensor is more sensitive. As a consequence, the present invention can often allow the number of basis functions to be reduced, while maintaining a high level of accuracy, for example, a minimum acceptable color difference detected by the sensor between an image processed using spectral reflectance data and an image processed using the basis functions.

A general method to construct basis functions includes performing eigen-analysis on a certain matrix derived from the spectral data. Depending on the choice of the matrix, the name of the technique may be singular value decomposition (SVD), principle component analysis (PCA), metric multi-dimensional scaling (MMDS), or other matrix or linear multivariate techniques, as one skilled in the art would recognize. In an eigen-analysis, the spectral space can be linearly transformed to take on a special position so that the new coordinate axes are uncorrelated with respect to the chosen attribute such as (statistical) correlation of the different spectra. Each coordinate basis vector is also associated with an eigenvalue, or more generally, a singular value. Sorting the new basis vectors according to the magnitude of their corresponding singular values gives the relative importance of the basis vectors, which in turn allows the least significant basis vectors (i.e., the basis vectors with the smaller singular values) to be easily identified and discarded. Discarding the least significant basis vectors reduces the dimensionality of the data, and as a result, can provide computational and memory savings. Because the coordinate transformation is orthogonal, which means that Euclidean distance in the spectral space is preserved, the singular values give a measure of the spectral error. For example, the singular values can provide an indication of the relative contributions of different components in the total error between a modeled spectral reflectance vector and a measured spectral reflectance vector in spectral space.

However, spectral error does not have a direct correlation with the response of most real-world sensors, for example, human visual perception. As a result, an application that constructs basis functions purely by minimizing spectral error can result in a greater number of basis functions (higher dimensionality) to achieve an acceptable level of accuracy for a particular sensor. As the dimensionality of the system increases to achieve a desired perceptual accuracy, the computational and memory requirements of the system also increase. In contrast, reducing the number of basis functions can lead to greater computation efficiency and memory savings.

The importance of reducing the number of basis functions (dimensionality), even by one or two, can be better understood by considering the computer hardware and software that will use the basis functions, for example, to process and generate picture images, CAD/CAM drawings, or to archive multispectral image data. In particular, computer hardware and software can have certain constraints or preferences resulting from design. For example, a processor might provide native support for a matrix operation in a particular dimension. In this regard, a typical graphics processing unit (GPU) on a video card can perform 4-dimensional matrix arithmetic very efficiently, but the same operations in higher dimensions are either unsupported or very inefficient. In such situation, a good basis function construction method is critical. A slightly inferior method may, for instance, produce nine basis functions while a better method produces eight, and this may not be a serious performance hit on a conventional CPU, but on a GPU natively supporting 4-dimensional matrices, nine can be just as bad as twelve, the next multiple of four after eight.

However, as mentioned above, a method that constructs basis functions purely by minimizing spectral error generally requires a greater number of basis functions. Moreover, the basis functions constructed by such a method might produce sub-optimal results when used by an application, for example, to process, store or render an image for a particular sensor. For example, a CAD/CAM application might construct basis functions for a set of spectral reflectances by minimizing spectral error and use the basis functions to generate image displays of a CAD/CAM drawing under different lighting conditions. While the constructed basis functions might be able to accurately model the set of spectral reflectances, the number of basis functions is generally larger than necessary to achieve indiscernible errors as perceived by a human observer.

In particular, because most optical sensors exhibit some form of wavelength dependence, perceived image accuracy is generally not measured in terms of spectral error. For example, color difference as perceived by humans is typically measured by $\Delta E$. While $\Delta E$ can be defined in many ways, present-day equations for $\Delta E$ are all based on the CIE system of colorimetry. In this light, if the reproduction quality is to be judged by humans in the end, spectral error is not necessarily the best error metric for construction of the basis functions.

Figure 7:
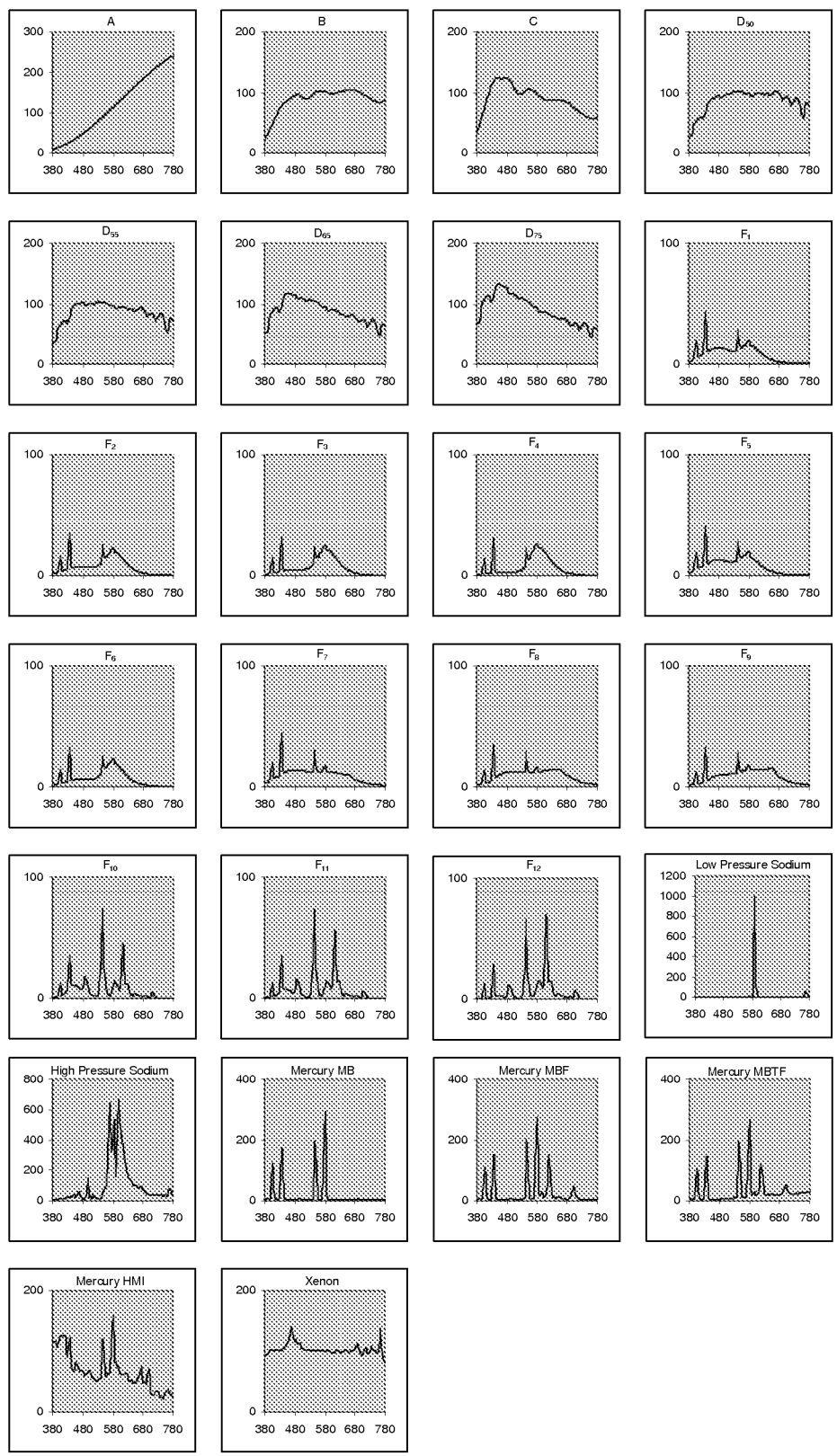
FIG. 7 illustrates the spectral power distributions of a plurality of common illuminants.

Rather than using spectral error in this case, $\Delta E$ could be used as the error metric. In fact, basis functions can be constructed using stochastic optimization on quality criterion that incorporates $\Delta E$. However, minimizing a quality criterion that is a function of $\Delta E$ can be computationally expensive, since the underlying operations are generally non-linear. Moreover, such a method can preclude the use of simpler and more computationally efficient types of analysis, such as eigen-analysis. In addition, unlike spectral error, $\Delta E$ is illuminant dependent. In particular, $\Delta E$ is typically calculated using one of a plurality of common illuminants, some of which are shown in FIG. 7. Therefore, construction of basis functions using $\Delta E$ as the error metric results in basis functions whose accuracy is dependent on the particular illuminant(s) used during the construction. Given the wide variety of common illuminants, basis functions constructed using $\Delta E$ as the error metric can be limited in their usefulness.

In sum, on the one hand computing basis functions using $\Delta E$ can be computationally inefficient and can result in a basis that is accurate for only a limited number of illuminants. On the other hand, computing basis functions using eigen-analysis directly on the spectral data can result in a basis that produces sub-optimal results for a particular sensor, or can require a large number of basis functions to achieve an acceptable level of accuracy for the sensor.

Figure 8:
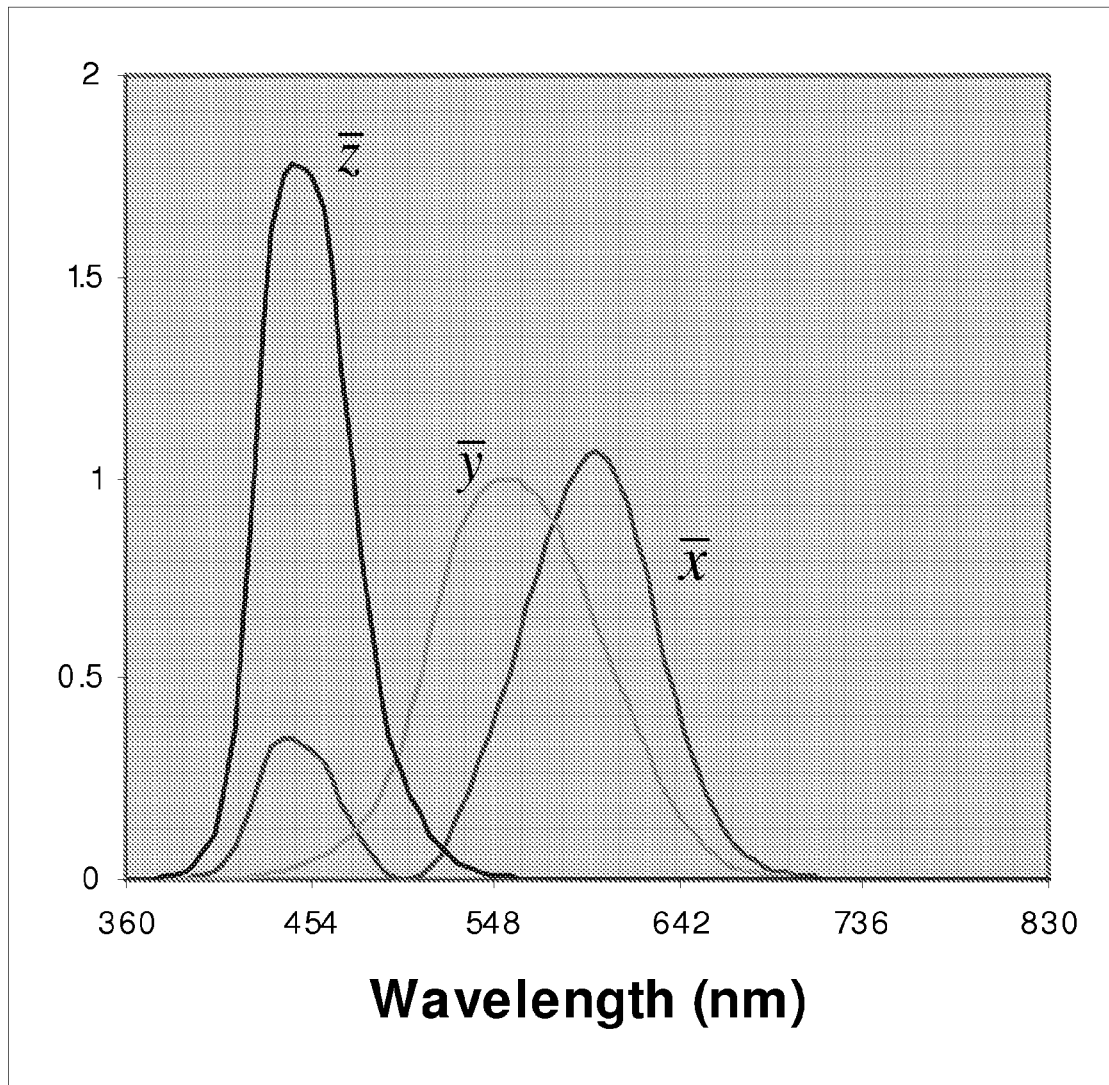
FIG. 8 is a graph illustrating the CIE Color Matching functions for Standard Observer.

The present invention provides for construction of basis functions based on a wavelength dependence of a sensor. For the human eye, this dependence is apparent from the CIE Color Matching functions for Standard Observer. (see FIG. 8). Using this fact, it is possible to assign weights to different wavelengths, effectively modifying the distance metric in the spectral space so that the new distance metric is a better measure of human perceived color difference. In other words, the present invention provides a way to exploit the wavelength dependency of the human visual system in weighting the spectral dimensions so that the resulting weighted metric gives a measure of color difference similar to $\Delta E$. The advantage of this approach is that basis functions can be computed with eigen-analysis techniques, such as SVD, after a simple weighting is applied to each spectral dimension. Eigen-analysis techniques are relatively fast compared to other techniques, such as nonlinear optimization techniques. Moreover, the new distance metric of the present invention can be illuminant independent.

The present invention may be implemented, for example, in a software application for constructing basis functions or spectral weighting functions, or may be implemented as part of a larger software and hardware package, such as CAD/CAM software, multi-spectral image capture devices and archival software, and spectral color-matching applications. Even if, for example, a CAD/CAM application did not include software for constructing basis functions or generating a spectral weighting function, the CAD/CAM application may still utilize the present invention by loading basis functions or spectral weighting functions that have been previously generated according to the present invention. It can be appreciated that the present invention is not limited to the aforementioned embodiments and that the present invention may be implemented in other forms as well.

FIG. 1 is a view showing the external appearance of a representative computing system including a data processing system, peripherals and digital devices that may be used in connection with the practice of the present invention. Data processing system 40 includes host processor 41, which comprises a personal computer (hereinafter "PC"). Provided with data processing system 40 are color monitor 43 including display screen 42, keyboard 46 for entering text data and user commands, and pointing device 47. Pointing device 47 can comprise a mouse and/or a pen-style input device (not shown) for pointing and for manipulating objects displayed on display screen 42.

Data processing system 40 includes a computer-readable memory medium such as computer fixed disk 45 and/or floppy disk drive 44. Floppy disk drive 44 provides a means whereby data processing system 40 can access information, such as image data, computer-executable process steps, application programs, etc. stored on removable memory media. A similar CD-ROM interface (not shown) may be provided for data processing system 40 through which data processing system 40 can access information stored on removable CD-ROM media.

Printer 50 is a printer, such as a color bubble jet printer, which forms color images on a recording medium such as paper or transparencies or the like. In addition, digital color scanner 70 is provided for scanning documents and images into data processing system 40 and digital color camera 60 is provided for sending digital images to data processing system 40. Of course, data processing system 40 may acquire digital image data from other sources such as a digital video camera (not shown). A spectrophotometer 80 may be provided for measuring the spectral reflectance of a color sample, and sending the spectral data to data processing system 40.

Figure 2:
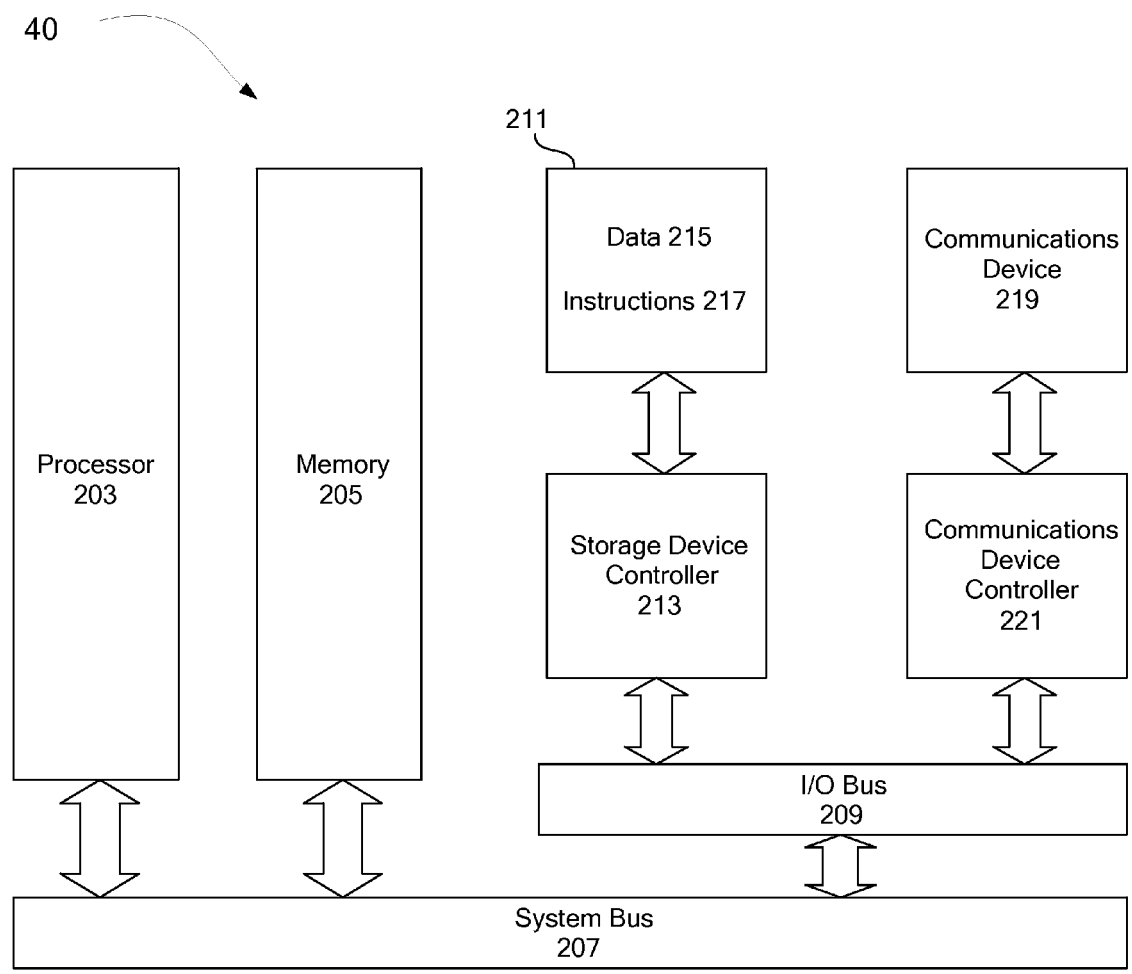
FIG. 2 is a block diagram of an exemplary computer architecture in which the present invention may be implemented.

FIG. 2 is an architecture diagram of an exemplary data processing system 40. Data processing system 40 includes a processor 203 coupled to a memory 205 via system bus 207. The processor is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below. For example, those instructions 217 can perform any of the methods described below for constructing basis functions for spectral reflectances and illuminants, and for generating spectral weighting functions.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to construct basis functions for spectral reflectances and illuminants, and to generate spectral weighting functions. Thus, processor 203 operates under the control of the instructions 217 to perform the methods of the present invention, as described in more detail below.

Figure 3:
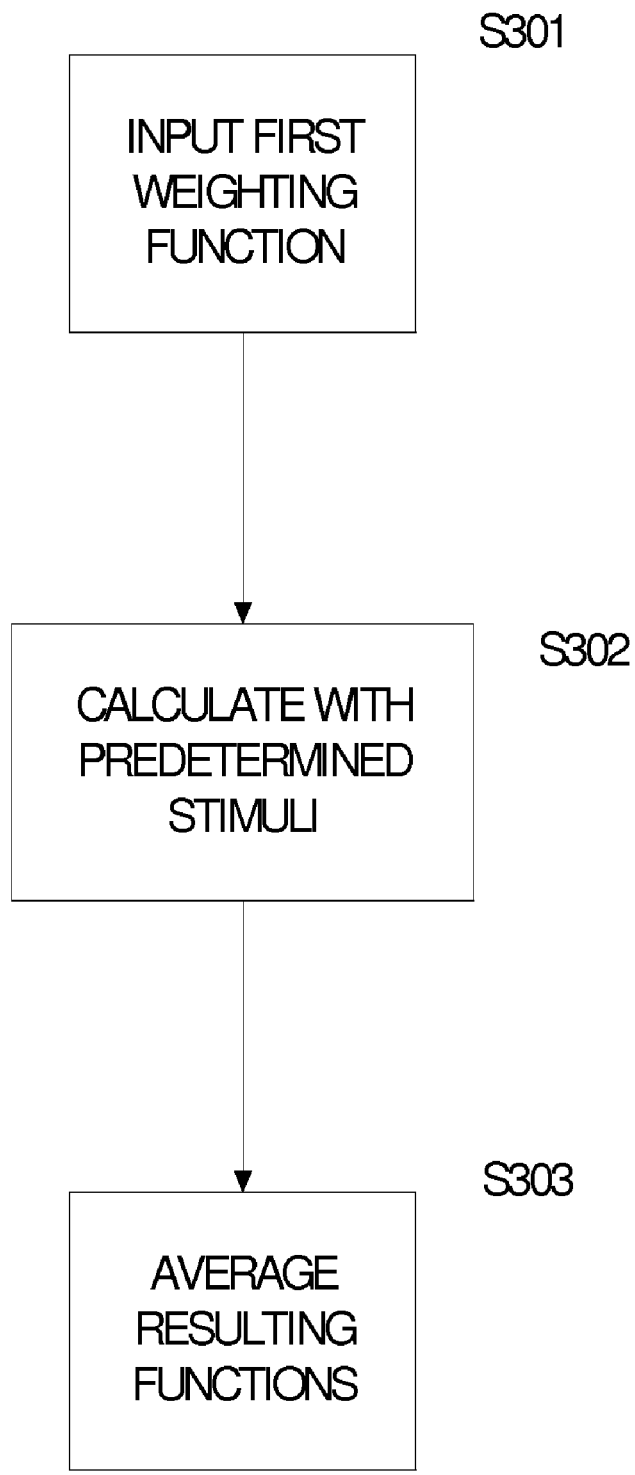
FIG. 3 is a flowchart of a method of generating a spectral weighting function for an optical sensor according to one embodiment of the present invention.

FIG. 3 is a flowchart of a method of generating a spectral weighting function for an optical sensor according to one embodiment of the present invention. At S301, a first weighting function is input. The first weighting function is based on a wavelength dependence of the optical sensor. While there may be many suitable functions that could be used as the first weighting function, the weighting at any particular wavelength preferably provides an indication of the sensitivity of the sensor at that wavelength.

For example, one exemplary first weighting function for the human visual system can be derived in the following manner. First, consider a spectral reflectance vector R that has been sampled at regular intervals of length $\Delta\lambda$. The spectral reflectance vector can be perturbed at $\lambda_0$ by a small amount $\delta$ to obtain a new vector R'. In other words, $$R'(\lambda_0) = R(\lambda_0) + \delta$$

Figure 9:
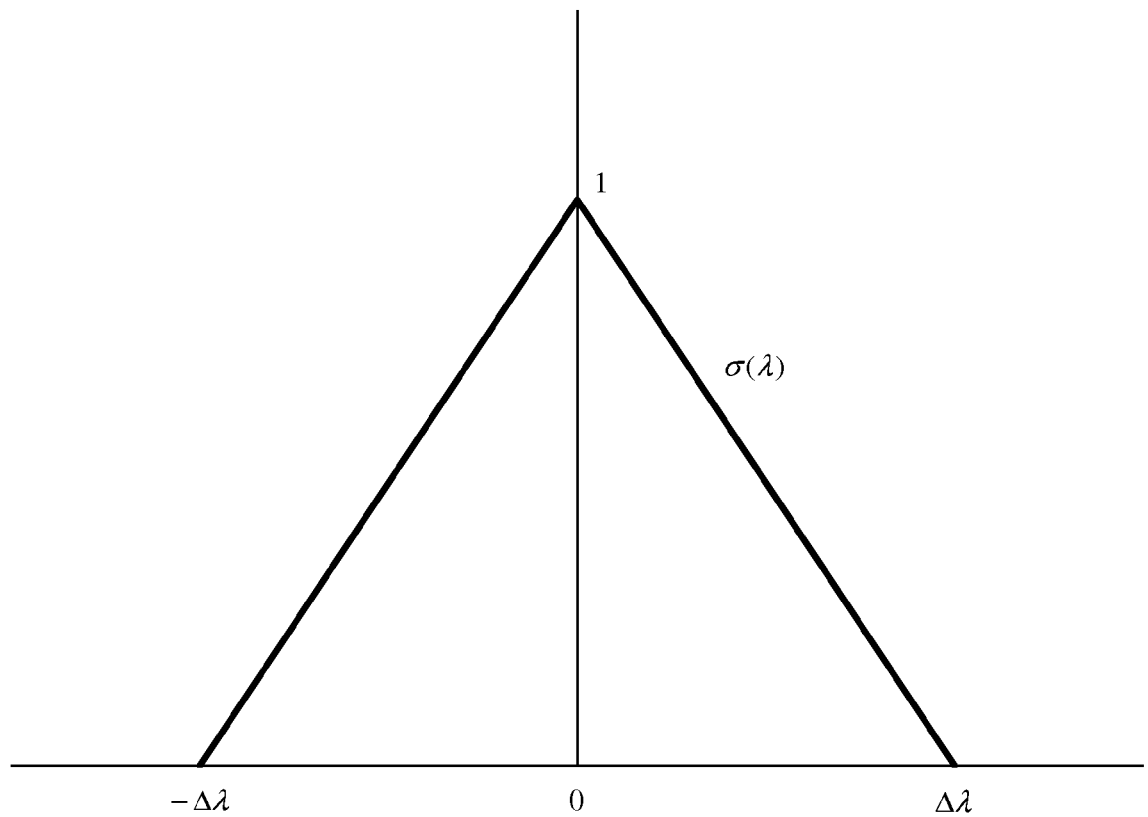
FIG. 9 is a graph illustrating a perturbation kernel $\sigma(\lambda)$, which can be used in an embodiment of the present invention.

This perturbation can also be expressed in terms of the whole spectral curve by using the perturbation kernel $\sigma(\lambda)$. This function is the discrete analog of the unit impulse function and its graph is shown in FIG. 9. Note that it depends on the step size $\Delta\lambda$.

$$R'(\lambda) = R(\lambda) + \delta \cdot \sigma(\lambda - \lambda_0)$$

Figure 10:
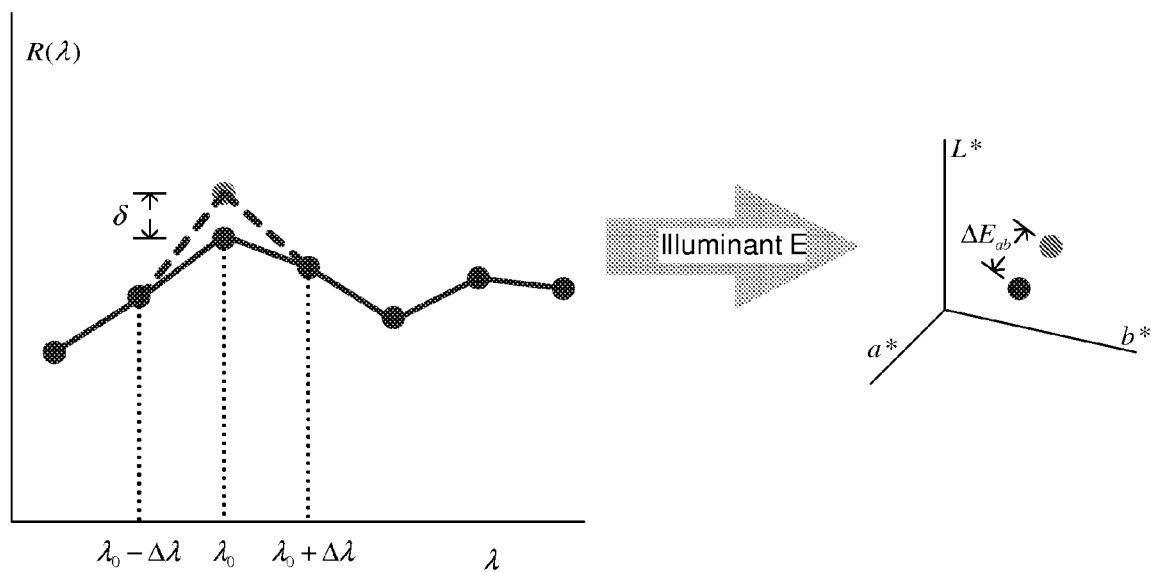
FIG. 10 is a graph illustrating an effect that a perturbation $\delta$ of a spectral reflectance causes in a CIELAB color space.

Under Illuminant E (which is spectrally flat), both R and R' can be realized as XYZ colors. They can be further converted to CIELAB color space under the same Illuminant E. The perturbation $\delta$ that causes a difference in the spectra would then cause a corresponding difference in CIELAB. (see FIG. 10). This color difference, manifested as a distance in CIELAB, is a good candidate for the weight to be imposed at $\lambda_0$.

This distance in CIELAB can be calculated explicitly. The change in reflectance at $\lambda_0$ causes a change in XYZ from the original value $X_0 Y_0 Z_0$, and this change is linearly related to $\delta$. In fact, the changes in X, Y, Z are given by $$\Delta X = \delta \cdot \tilde{x}(\lambda_0)$$

$$\Delta Y = \delta \cdot \tilde{y}(\lambda_0), \text{ where}$$

$$\Delta Z = \delta \cdot \tilde{z}(\lambda_0)$$

$$\tilde{x}(\lambda_0) = \int \bar{x}(\lambda) \cdot \sigma(\lambda - \lambda_0) d\lambda$$

$$\tilde{y}(\lambda_0) = \int \bar{y}(\lambda) \cdot \sigma(\lambda - \lambda_0) d\lambda$$

$$\tilde{z}(\lambda_0) = \int \bar{z}(\lambda) \cdot \sigma(\lambda - \lambda_0) d\lambda$$

These are smoothed versions of the CIE color matching functions, and if step size $\Delta\lambda$ is small enough, they have essentially the same shape. Now $\Delta X$, $\Delta Y$ and $\Delta Z$ in turn cause a change in CIELAB, namely $$\Delta L^* = \frac{\partial L^*}{\partial Y}(X_0, Y_0, Z_0) \cdot \Delta Y$$

$$\Delta a^* = \frac{\partial a^*}{\partial X}(X_0, Y_0, Z_0) \cdot \Delta X + \frac{\partial a^*}{\partial Y}(X_0, Y_0, Z_0) \cdot \Delta Y$$

$$\Delta b^* = \frac{\partial b^*}{\partial Y}(X_0, Y_0, Z_0) \cdot \Delta Y + \frac{\partial b^*}{\partial Z}(X_0, Y_0, Z_0) \cdot \Delta Z$$

The foregoing equations incorporate the particular form of functional dependency of CIELAB on XYZ. The first weighting function can be derived from the forgoing equations. However, further simplification is possible:

$$\Delta L^* = \frac{116}{Y_E} \cdot DF(Y_0) \cdot \Delta Y$$

$$\Delta a^* = \frac{500}{X_E} \cdot DF(X_0) \cdot \Delta X - \frac{500}{Y_E} \cdot DF(Y_0) \cdot \Delta Y$$

$$\Delta b^* = \frac{200}{Y_E} \cdot DF(Y_0) \cdot \Delta Y - \frac{200}{Z_E} \cdot DF(Z_0) \cdot \Delta Z$$

$$X_E = \int \bar{x}(\lambda) d\lambda, \ Y_E = \int \bar{y}(\lambda) d\lambda, \ Z_E = \int \bar{z}(\lambda) d\lambda$$

$$DF(x) = \begin{cases} \frac{1}{3} x^{-2/3} & \text{if } x > \frac{216}{24389} \\ \frac{841}{108} & \text{if } x \leq \frac{216}{24389} \end{cases}$$

The distance in CIELAB is given by $$\Delta E_{ab} = \sqrt{(\Delta L^*)^2 + (\Delta a^*)^2 + (\Delta b^*)^2}$$

Taking the limit as $\delta$ approaches 0, an expression for the local spectral weighting function that is input is obtained (S301):

$$\overline{w}_{loc}(\lambda; X_0, Y_0, Z_0) = \sqrt{\Lambda^2 + A^2 + B^2}$$

$$\Lambda = \frac{116}{Y_E} \cdot DF(Y_0) \cdot \tilde{y}(\lambda)$$

$$A = 500 \cdot \left[ \frac{DF(X_0)}{X_E} \cdot \tilde{x}(\lambda) - \frac{DF(Y_0)}{Y_E} \cdot \tilde{y}(\lambda) \right]$$

$$B = 200 \cdot \left[ \frac{DF(Y_0)}{Y_E} \cdot \tilde{y}(\lambda) - \frac{DF(Z_0)}{Z_E} \cdot \tilde{z}(\lambda) \right]$$

It is "local" because it depends on $X_0 Y_0 Z_0$, although it does not depend on the original spectrum from which $X_0 Y_0 Z_0$ is derived. Another observation is that although it is the square root of a sum of squares, it still looks like some kind of blending of the smoothed (tilde) version of the three CIE color matching functions.

In the above derivation of an exemplary first weighting function to be input at S301, CIELAB is used. CIELAB is a perceptually linear color space for human vision. Other perceptually linear color spaces that incorporate the psychophysics of human vision may be used, such as CIECAM02. First weighting functions for other sensors may require different color spaces. For example, for a multi-spectral capture device, a suitable linear device space may be used. In addition, it is not necessary that there is an analytical spectral model for the sensor. In particular, if the sensitivity curves are not known or are hard to determine experimentally, which prohibits algebraic evaluation of derivatives, the above procedure of performing an infinitesimal perturbation on a spectrum may be modified to a small finite perturbation on a spectrum applied to an empirical spectral model of the sensor. This can be implemented using the numerical technique of finite differences, for example.

Referring to FIG. 3, once the first weighting function has been input at S301, the first weighting function is calculated (S302) with a set of predetermined stimuli, and the results are averaged (S303). In this way, the local dependence of the weighting function on one stimulus can be reduced or removed, and the result is a spectral weighting function for the optical sensor.

The predetermined stimuli used in S302 can be a set of color samples with known spectral reflectances. In this case, the above weighting function is computed for each sample, and then the average of the resulting functions is calculated.

Figure 4:
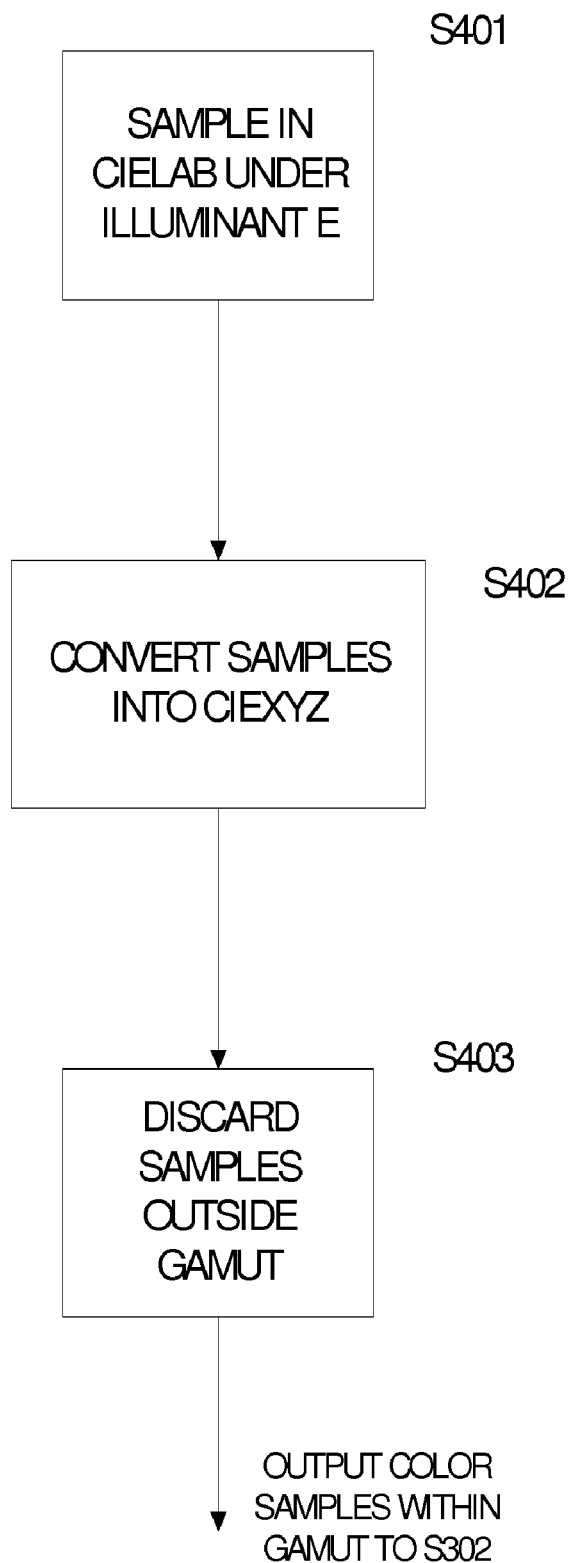
FIG. 4 is a flowchart of a method of constructing color samples according to one embodiment of the present invention.

The predetermined stimuli used in S302 can also be constructed. One method of constructing the color samples suitable for human vision is illustrated by the flowchart of FIG. 4. In the exemplary method of FIG. 4, the whole CIE visual gamut is sampled. In this regard, since the weights depend only on XYZ, and not the whole spectrum, samples are taken only from the XYZ space, not the full spectral space, which has a very high dimension. In addition, if a uniform sampling is performed, it is desirable to do so in CIELAB, which is perceptually uniform. So, instead of sampling in XYZ space, samples are taken in CIELAB space under Illuminant E. For example, a bounding box in CIELAB is defined by $$0 \leq L^* \leq 100$$

$$-150 \leq a^* \leq 150$$

$$-150 \leq b^* \leq 150$$

This bounding box is sampled (S401) in 129 steps in each direction. This creates 129×129×129=2,146,689 samples in CIELAB space. Not all of them are in the CIE visual gamut, however, so each sample is converted (S402) to XYZ and then checked (S403) to see if it lies within the CIE spectral locus. In the present example, it turns out that only T=1,170,609 are inside the CIE visual gamut. (This number may be slightly different depending on the implementation.) Each of the surviving samples is output to S302, where the local spectral weighting function is computed for each surviving sample, as given by the equations above. Then the arithmetic average is calculated of all these functions (curves) to obtain the spectral weighting function:

$$\overline{w}(\lambda) = \frac{1}{T}\sum_{i=1}^{T} \overline{w}_{loc}(\lambda; X_i, Y_i, Z_i)$$

where $X_i, Y_i, Z_i$ lies inside the CIE visual gamut.

Figure 11:
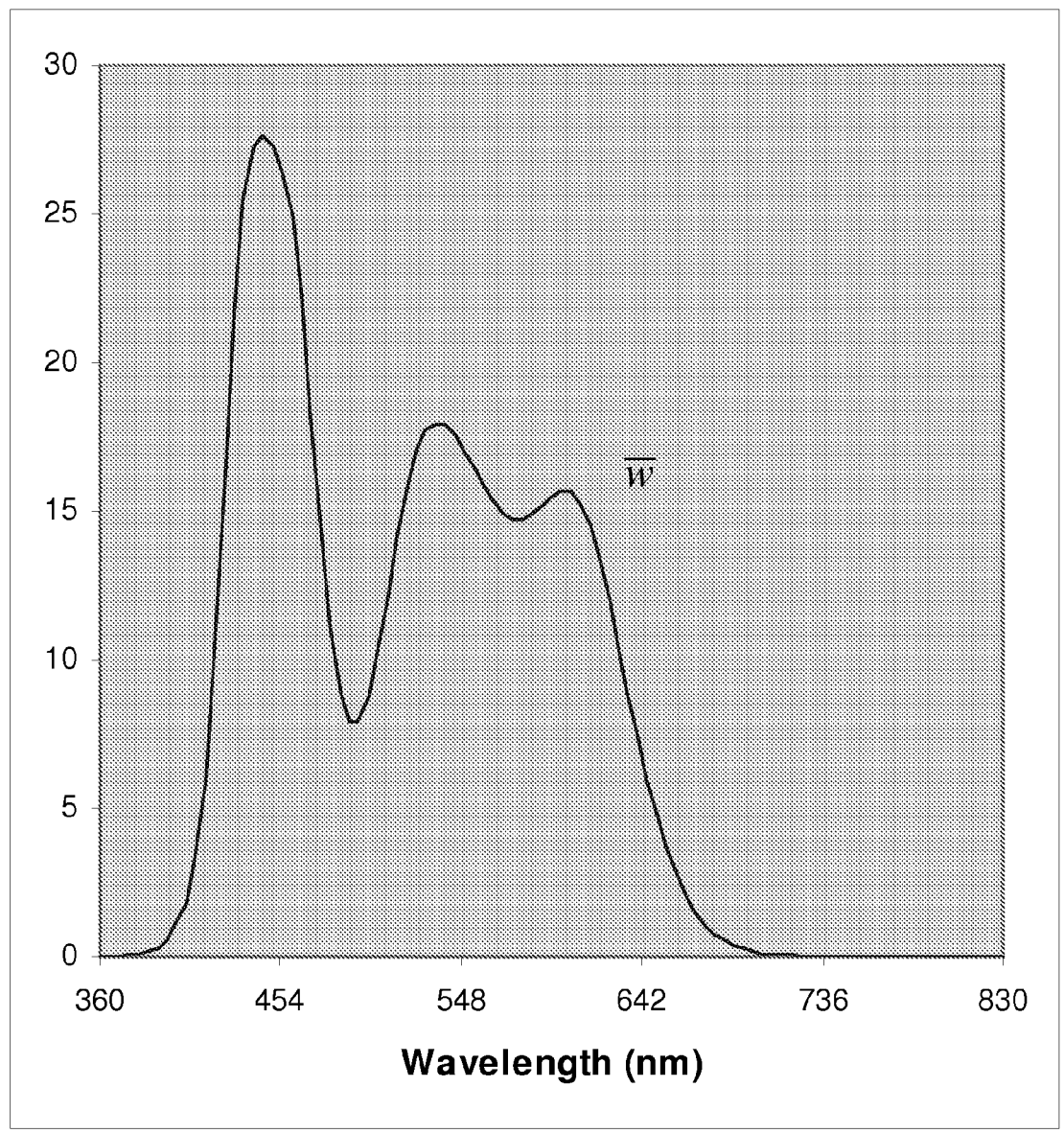
FIG. 11 is a graph of a spectral weighting function generated according to one embodiment of the present invention.

The results for 5 nm-wavelength intervals are tabulated in Table 2, and the curve plotted in FIG. 11 as the spectral weighting function. Again, comparison with the CIE color matching functions (FIG. 8) shows that it shares many features (such as local maxima) with the color matching functions.

The spectral weighting function depends on the step size Δλ, because the latter determines the perturbation kernel. In particular, the numerical values of the function will change if a different step size is used. But as long as the step size is small enough, two different weighting functions would only differ by a constant multiple. As only the weights are used to determine the relative importance of wavelength bands, the absolute magnitudes have no significance.

The spectral weighting function can be used, for example, to generate basis functions for spectral reflectances and illuminants. In particular, use of the spectral weighting function is one way to provide that the generation of the basis functions is based on a wavelength dependence of the sensor.

Turning first to the generation of basis functions for spectral reflectances, in general, given a set of samples with spectral reflectances measured at N sampling locations (which generally are evenly spaced according to a step size), the goal is to find a set of n basis functions for the set of samples, with n as small as possible. N is typically determined by the measuring instrument used, and is a relatively large number usually ≧30. The worst case is n=N but usually a much lower n can be chosen without causing significant color error.

The present invention can allow for a reduction in n for a given optical sensor, for example, since the reflectance information (e.g., the measured spectral reflectances of the color samples) is weighted with a weighting function based on a wavelength dependence of the sensor.

Figure 5:
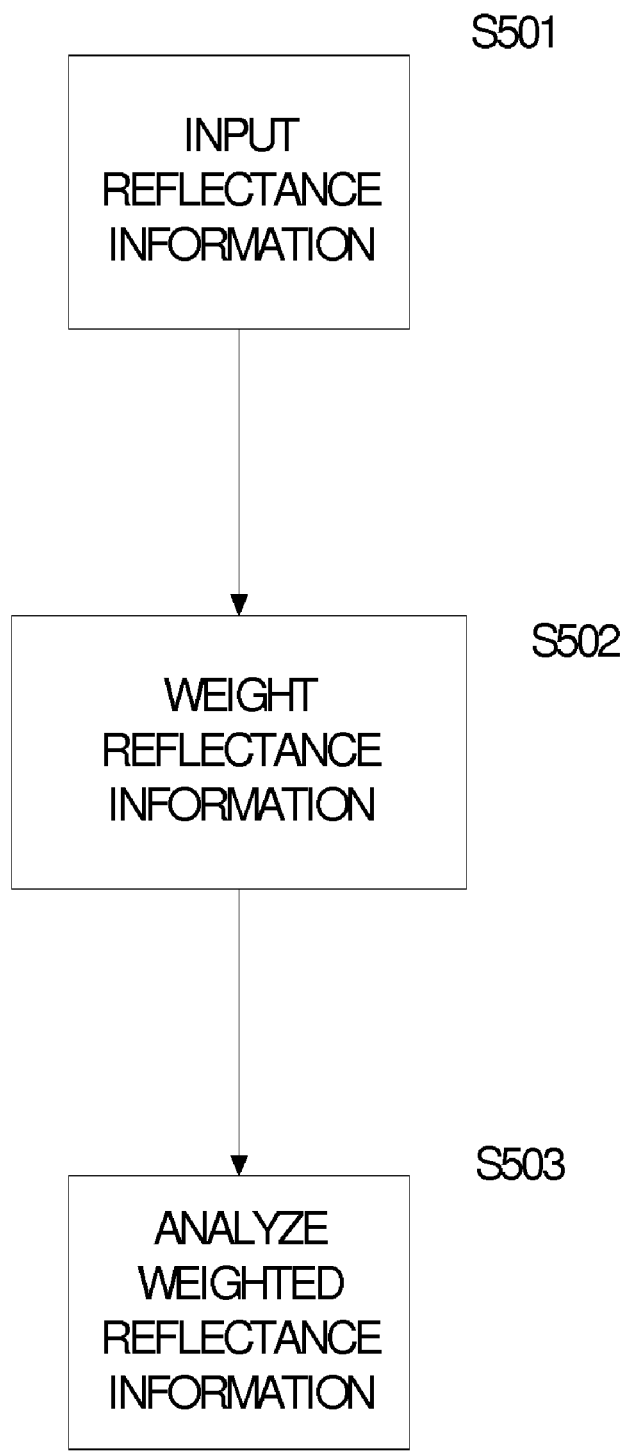
FIG. 5 is a flowchart of a method of generating basis functions for spectral reflectances of a set of color samples according to one embodiment of the present invention.

FIG. 5 is a flowchart of a method of generating basis functions for spectral reflectances of a set of color samples according to one embodiment of the present invention. At S501, reflectance information of a set of color samples in input. For example, suppose there are M samples and the reflectance of each sample was measured at N sampling locations. In this case, the M×N reflectance values are input and an M×N matrix of the reflectance values would be formed. Of course, the reflectance information could also be input as a pre-formed M×N matrix.

The reflectance information is weighted (S502) with a weighting function based on a wavelength dependence of a predetermined optical sensor. For example, the spectral weighting function $\overline{w}(\lambda)$ discussed above could be used to weight the reflectance information. In particular, if the spectral weighting function has been determined for the step size used in the reflectance information, weighting the reflectance information could be a simple operation of multiplying each column of the reflectance information matrix by the corresponding spectral weight $\overline{w}(\lambda)$.

The weighted reflectance information is analyzed (S503) to obtain the basis functions for the spectral reflectances of the set of color samples. For example, eigen-analysis such as SVD could be used to analyze the weighted reflectance information. In this case, singular value decomposition is performed on the matrix to determine the N right singular vectors sorted in order of decreasing singular values, and the first n singular vectors are chosen. The choice of n may be determined separately from or together with considerations such as system constraints (e.g., a requirement that n is a multiple of 4 in the case of GPU implementation). For each of the n singular vectors, divide the components by the corresponding spectral weight, $\overline{w}(\lambda)$. The resulting vectors $\{\hat{R}_1(\lambda), \hat{R}_2(\lambda), \ldots \hat{R}_n(\lambda)\}$ are the basis functions for the spectral reflectances of the color samples.

To calculate the coefficients of a given spectral reflectance vector $R(\lambda)$ relative to the basis function $\hat{R}_i(\lambda)$, the weighted dot product is formed by:

$$c_i = \Sigma \overline{w}(\lambda)^2 R(\lambda) \hat{R}_i(\lambda)$$

The projection $$\hat{R}(\lambda) = \sum_{i=1}^{n} c_i \hat{R}_i(\lambda)$$

will be an approximation to the original spectral reflectance vector $R(\lambda)$, and if n is chosen appropriately, the color difference between $R(\lambda)$ and $\hat{R}(\lambda)$ will be small under arbitrary illuminant.

For example, when the above procedure is applied to a Munsell dataset for matte samples, and color difference calculated using different illuminants, Table 3 is obtained, which shows the dependence on the number n of basis functions used. Notice the fast convergence to zero in every case of illuminant, compared to the un-weighted results (Table 1). Even in the extreme case of low pressure sodium lamp (which has basically one single spike), the reflectances can be modeled reasonably well in as low as eight dimensions. For "normal" illuminants (even spiky ones such as $F_{11}$), dimension as low as four is enough.

Figure 6:
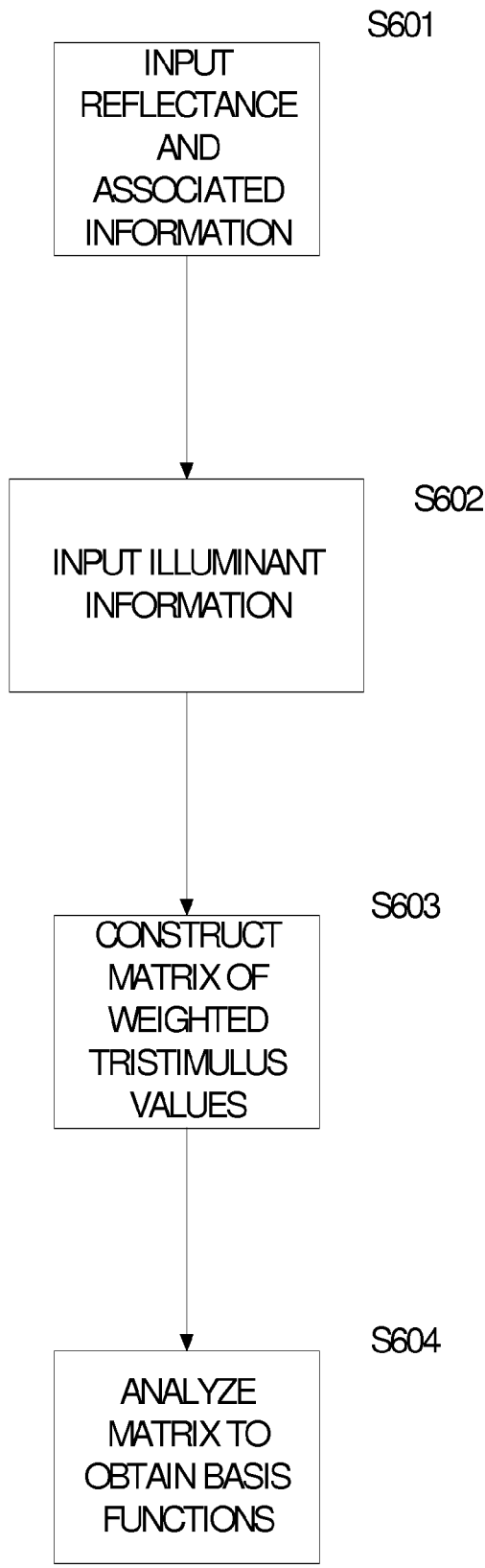
FIG. 6 is a flowchart of a method of generating the basis functions according to one embodiment of the present invention.

The generation of basis functions for a set of illuminants will now be discussed with reference to FIG. 6, which is a flowchart of a method of generating the basis functions according to one embodiment of the present invention. At S601, reflectance information and associated information of predetermined basis functions for spectral reflectances of a set of color samples is input. For example, the basis functions $\{\hat{R}_1(\lambda), \hat{R}_2(\lambda), \ldots, \hat{R}(\lambda)\}$ for the spectral reflectances obtained by the above method can be input as reflectance information, and the corresponding singular values $s_1, s_2, \ldots, s_n$ can be input as associated information. In many cases, the basis functions generated by the above method for spectral reflectances can provide a good starting point for the generation of basis functions for the SPDs of illuminants.

Illuminant information of a predetermined subset of a plurality of predetermined illuminants is input (S602). In this regard, the plurality of K illuminants $I_1(\lambda), I_2(\lambda), \ldots, I_K(\lambda)$ can be a representative set of illuminants that will be encountered in an application. The subset can be the whole set, or it can be a specially chosen subset of k<K illuminants.

At this point, a simple-minded approach is to apply SVD to the spectra of the illuminants. However, this is not necessarily the optimal approach, particularly in terms of reducing the dimension, because this approach minimizes spectral error, not perceptual color difference. In this regard, at S603, a matrix of weighted tristimulus values is constructed from the reflectance information and associated information and the illuminant information. Since minimizing perceptual color difference is a goal, the matrix can be based on CIEXYZ, for example. In this case, the following matrix is constructed:

$$\mathcal{J}_0 = \begin{pmatrix} X_1(I_1) & Y_1(I_1) & Z_1(I_1) & X_2(I_1) & Y_2(I_1) & Z_2(I_1) & \cdots & X_n(I_1) & Y_n(I_1) & Z_n(I_1) \\ \vdots & \vdots & \vdots & \vdots & \vdots & \vdots & \ddots & \vdots & \vdots & \vdots \\ X_1(I_K) & Y_1(I_K) & Z_1(I_K) & X_2(I_K) & Y_2(I_K) & Z_2(I_K) & \cdots & X_n(I_K) & Y_n(I_K) & Z_n(I_K) \end{pmatrix}$$

where $X_i(I) = \int \hat{R}_i(\lambda) I(\lambda) \bar{x}(\lambda) d\lambda$ $Y_i(I) = \int \hat{R}_i(\lambda) I(\lambda) \bar{y}(\lambda) d\lambda$ $Z_i(I) = \int \hat{R}_i(\lambda) I(\lambda) \bar{z}(\lambda) d\lambda$ Constructing this matrix essentially amounts to transforming the space of SPDs, which is N dimensional if N is the number of sampling steps used in measuring the SPDs, to the 3n-dimensional space which consists of XYZs of the basis functions of the spectral reflectances under the illuminants. In effect, the spectral space is replaced by copies of XYZ space under different illuminants. This is not really a loss of information, if the output of the system is to a colorimetric (trichromatic) sensor, such as the human eye.

The process is further optimized by taking into account the relative importance of the basis $\{\hat{R}_1(\lambda), \hat{R}_2(\lambda), \ldots, \hat{R}_n(\lambda)\}$, which corresponds to the associated singular values. Therefore, S603 can include modifying the matrix above to incorporate the singular values input at S601, to result in the following matrix:

$$\mathcal{J} = \begin{pmatrix} \check{X}_1(I_1) & \check{Y}_1(I_1) & \check{Z}_1(I_1) & \check{X}_2(I_1) & \check{Y}_2(I_1) & \check{Z}_2(I_1) & \cdots & \check{X}_n(I_1) & \check{Y}_n(I_1) & \check{Z}_n(I_1) \\ \vdots & \vdots & \vdots & \vdots & \vdots & \vdots & \ddots & \vdots & \vdots & \vdots \\ \check{X}_1(I_K) & \check{Y}_1(I_K) & \check{Z}_1(I_K) & \check{X}_2(I_K) & \check{Y}_2(I_K) & \check{Z}_2(I_K) & \cdots & \check{X}_n(I_K) & \check{Y}_n(I_K) & \check{Z}_n(I_K) \end{pmatrix}$$

where $\check{X}_i(I) = s_i \int \hat{R}_i(\lambda) I(\lambda) \bar{x}(\lambda) d\lambda$ $\check{Y}_i(I) = s_i \int \hat{R}_i(\lambda) I(\lambda) \bar{y}(\lambda) d\lambda$ $\check{Z}_i(I) = s_i \int \hat{R}_i(\lambda) I(\lambda) \bar{z}(\lambda) d\lambda$ The resulting matrix takes values in a multi-XYZ space, rather than spectral space. In particular, the basis functions will take values in this 3n-dimensional space of scaled XYZs according to the matrix. While there may appear to be a loss of spectral information, for a colorimetric sensor, it is XYZs that are desired at the end, so there is not a requirement that the basis functions must take values in the spectral space. Furthermore, scaling the XYZs by the singular values alters the distance metric in this multi-XYZ space to the effect that XYZs arising from dominant spectral reflectance basis vectors are given more weight. Although the basis functions take values in a multi-XYZ space, they will continue to be referred to herein as basis functions for the illuminants, even though common usage refers to basis functions that take values in the spectral space.

At S604, the matrix of weighted tristimulus values is analyzed to obtain the basis functions for the illuminants. For example, eigen-analysis, such as SVD, can be performed on the matrix $\mathcal{J}$, and the first k (right) singular vectors can be selected, where k again may be determined by considerations such as system data width. The k singular vectors must then be un-scaled by the same singular values $s_i$ to obtain the set of basis functions for the illuminants:

$\{\hat{I}_1, \ldots, \hat{I}_k\}$ where $\hat{I}_j = (X_{1j}, Y_{1j}, Z_{1j}, \ldots, X_{nj}, Y_{nj}, Z_{nj})^T$ To obtain the coefficients relative to the basis functions $\{\hat{I}_1, \ldots, \hat{I}_k\}$ for a given illuminant I, the following equation can be used:

$$I(\lambda) = \sum_\omega \alpha_\omega \cdot \sigma(\lambda - \omega)$$

where the summation runs through all $\omega$ at the sampling locations of wavelength, since every illuminant I can be expressed as a weighted sum of the shifted perturbation kernel at the sampling wavelength locations.

Each $\sigma_\omega(\lambda) = \sigma(\lambda - \omega)$ can be treated as a mathematical illuminant (since it is not physical) so that $X_i(\sigma_\omega), Y_i(\sigma_\omega), Z_i(\sigma_\omega)$ can be evaluated. The weighted dot product of this vector can then be formed with each basis function to get the coefficient matrix ($\Phi_{j\omega}$):

$$\Phi_{j\omega} = \sum_{i=1}^n s_i^2 (X_{ij} \cdot X_i(\sigma_\omega) + Y_{ij} \cdot Y_i(\sigma_\omega) + Z_{ij} \cdot Z_i(\sigma_\omega))$$

Putting all these together, for a reflectance vector given by $$R(\lambda) = \sum_{i=1}^n c_i \hat{R}_i(\lambda)$$

and under illuminant $$I(\lambda) = \sum_\omega \alpha_\omega \cdot \sigma(\lambda - \omega),$$

the XYZ are given by:

$$X = \sum_{i=1}^{n} \sum_{j=1}^{k} \sum_{\omega} c_i X_{ij} \Phi_{j\omega} \alpha_\omega$$

$$Y = \sum_{i=1}^{n} \sum_{j=1}^{k} \sum_{\omega} c_i Y_{ij} \Phi_{j\omega} \alpha_\omega$$

$$Z = \sum_{i=1}^{n} \sum_{j=1}^{k} \sum_{\omega} c_i Z_{ij} \Phi_{j\omega} \alpha_\omega$$

One embodiment makes use of the input subset of k illuminants, $k<K$, $\{J_1, \ldots, J_k\} \subseteq \{I_1, \ldots, I_K\}$ where each J is some I. Instead of forming $\Im$ above, form instead $$\mathcal{J} = \begin{pmatrix} \breve{X}_1(J_1) & \breve{Y}_1(J_1) & \breve{Z}_1(J_1) & \breve{X}_2(J_1) & \breve{Y}_2(J_1) & \breve{Z}_2(J_1) & \cdots & \breve{X}_n(J_1) & \breve{Y}_n(J_1) & \breve{Z}_n(J_1) \\ \vdots & \vdots & \vdots & \vdots & \vdots & \vdots & \ddots & \vdots & \vdots & \vdots \\ \breve{X}_1(J_k) & \breve{Y}_1(J_k) & \breve{Z}_1(J_k) & \breve{X}_2(J_k) & \breve{Y}_2(J_k) & \breve{Z}_2(J_k) & \cdots & \breve{X}_n(J_k) & \breve{Y}_n(J_k) & \breve{Z}_n(J_k) \end{pmatrix}$$

Using a subset of illuminants instead of the full set can be effective because some illuminants are more "difficult" than the others, and would incur higher color difference. The low pressure sodium lamp is one example. So in general, if k of the most difficult and/or representative illuminants are selected, a matrix $\Im$ of size $k \times 3n$ is formed, and SVD is performed on the matrix, then the maximum number of basis functions is also k, and this basis would be error free for the k illuminants.

For example, applying this modification of the method to the 26 illuminants shown in FIG. 7 by handpicking the following k=8 illuminants used in $\Im$:

Illuminant A, Illuminant $D_{50}$, Illuminant $F_2$, Illuminant $F_7$, Illuminant $F_{11}$, Low pressure sodium lamp, Mercury MB, Xenon Table 4 was obtained.

In the embodiments disclosed above, all of the operations are linear and the results can be formulated in terms of matrices. While the invention is not limited to the use of a matrix formulation, the ability to form results in matrix form offers some advantages, particularly when the methods of the invention are implemented by a computer processor. In one advantage, the invention can allow selection of the dimension of the set of basis functions to correspond to native matrix operations of a particular processor, for example a graphics processing unit on a graphics card. In this regard, the formulation of matrices will now be discussed.

Assume for simplicity that N is the sampling dimension for both the spectral reflectances and SPDs. An illuminant is thus represented by a vector $$\alpha = (\alpha_1, \ldots, \alpha_N)^T$$

The reflectances can also be represented as N-vectors, but since they are assumed to be fixed in the present embodiment, their coefficients relative to the basis $\{\hat{R}_1(\lambda), \hat{R}_2(\lambda), \ldots, \hat{R}_n(\lambda)\}$ are assumed to have already been computed. In other words, it is assumed that a reflectance is represented by an n-vector:

$$c = (c_1, \ldots, c_n)^T$$

As described above, the $k \times N$ matrix $\Phi$ converts $\alpha$ to its coefficients $\psi$ relative to the illuminant basis:

$$\Phi = (\Phi_{j\omega})$$

$$\psi = \Phi \alpha$$

The XYZs from the illuminant basis are collected into 3 $n \times k$ matrices:

$$X = (X_{ij})$$

$$Y = (Y_{ij})$$

$$Z = (Z_{ij})$$

which can be written as:

$$X = c^T X \psi$$

$$Y = c^T Y \psi$$

$$Z = c^T Z \psi$$

In Computer Graphics, it is more common that the final destination is a calibrated RGB monitor. In that case, there is a $3 \times 3$ matrix $M = (m_{ij})$ relating the XYZ and (linear) RGB:

$$\begin{pmatrix} R \\ G \\ B \end{pmatrix} = M \cdot \begin{pmatrix} X \\ Y \\ Z \end{pmatrix}$$

Then it is straightforward to see that $$R = c^T R \psi$$

$$G = c^T G \psi$$

$$B = c^T B \psi$$

$$R = m_{11} X + m_{12} Y + m_{13} Z$$

$$G = m_{21} X + m_{22} Y + m_{23} Z$$

$$B = m_{31} X + m_{32} Y + m_{33} Z$$

On hardware that handles matrices of dimension four as packed data, it is important to choose n and k to be a multiple of four. For example, if $n=k=8$, then the above matrices can be partitioned into blocks each of dimension four:

$$c^T = (c_1^T \vdots c_2^T)$$

$$R = \begin{pmatrix} R_{11} & \vdots & R_{12} \\ \cdots & \cdots & \cdots \\ R_{21} & \vdots & R_{22} \end{pmatrix}, G = \begin{pmatrix} G_{11} & \vdots & G_{12} \\ \cdots & \cdots & \cdots \\ G_{21} & \vdots & G_{22} \end{pmatrix},$$

$$B = \begin{pmatrix} B_{11} & \vdots & B_{12} \\ \cdots & \cdots & \cdots \\ B_{21} & \vdots & B_{22} \end{pmatrix}$$

$$\psi = \begin{pmatrix} \psi_1 \\ \cdots \\ \psi_2 \end{pmatrix}$$

Then $$R = (c_1^T R_{11} + c_2^T R_{21}) \psi_1 + (c_1^T R_{12} + c_2^T R_{22}) \psi_2$$

$$G = (c_1^T G_{11} + c_2^T G_{21}) \psi_1 + (c_1^T G_{12} + c_2^T G_{22}) \psi_2$$

$$B = (c_1^T B_{11} + c_2^T B_{21}) \psi_1 + (c_1^T B_{12} + c_2^T B_{22}) \psi_2$$

The efficiency of 4-dimensional matrix arithmetic can therefore be exploited.

On a programmable GPU, the above operations can be implemented in the vertex and pixel shaders that are responsible for calculating the vertex positions and pixel colors respectively in one frame. Using the fact that the illuminant has already been fixed in one frame, the number of matrix operations in the pixel shader (which is the natural place for the above to be implemented) can be reduced further. Performing a partition of the 8×3 matrix into two 4×3 matrices:

$$(R\Psi \ G\Psi \ B\Psi) = \begin{pmatrix} \Omega_1 \\ \cdots \\ \Omega_2 \end{pmatrix}$$

which is equivalent to:

$$\begin{pmatrix} R \\ G \\ B \end{pmatrix}^T = c_1^T \Omega_1 + c_2^T \Omega_2$$

$\Omega_1$ and $\Omega_2$ can be updated outside the GPU, i.e. by the CPU of a general purpose computer, whenever the illuminant changes. $c_1$ and $c_2$ can be implemented as four-valued (conventionally thought of as RGBA) textures. These can be passed into the GPU from a program running on the CPU. Then in the pixel shader, it takes only two matrix multiplications and one addition to update a pixel.

Finally, it is noted that the RGB obtained above is "linear" RGB. Typical display devices such as CRT monitors have a nonlinear transformation from XYZ that can be modeled using TRCs (Tone Reproduction Curves). In general, these are 1D lookup tables. In the GPU, they can be implemented as 1D textures.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

TABLE 1

Color Difference as a function of number of spectral basis functions and illuminant, for the case of no spectral weights, applied to the Munsell spectral data

| Illuminant | A | | $D_{65}$ | | $F_{11}$ | | Low Pressure Sodium | |
|---|---|---|---|---|---|---|---|---|
| Dimension | Av. $\Delta E_{94}$ | Max. $\Delta E_{94}$ | Av. $\Delta E_{94}$ | Max. $\Delta E_{94}$ | Av. $\Delta E_{94}$ | Max. $\Delta E_{94}$ | Av. $\Delta E_{94}$ | Max. $\Delta E_{94}$ |
| 1 | 16.52625 | 38.05106 | 16.60774 | 37.86626 | 17.06582 | 38.62297 | 8.304002 | 30.99514 |
| 2 | 9.527071 | 37.68452 | 11.47855 | 41.03202 | 11.68616 | 42.72770 | 4.364892 | 35.36940 |
| 3 | 1.886769 | 19.40242 | 2.124298 | 19.09191 | 2.553191 | 23.90844 | 2.672613 | 27.36081 |
| 4 | 1.439421 | 13.28631 | 1.245762 | 7.990994 | 2.166894 | 15.99042 | 1.163914 | 33.49200 |
| 5 | 0.677846 | 3.565059 | 0.794013 | 6.384117 | 1.166479 | 23.76108 | 1.023396 | 38.59575 |
| 6 | 0.308671 | 2.879943 | 0.378414 | 6.687402 | 0.807425 | 23.90140 | 0.944925 | 38.23101 |
| 7 | 0.299261 | 3.264801 | 0.335418 | 2.775759 | 0.550141 | 11.00519 | 0.524319 | 7.616894 |
| 8 | 0.107353 | 3.168187 | 0.137018 | 2.825779 | 0.505059 | 10.86009 | 0.505421 | 7.449012 |
| 9 | 0.066777 | 0.902644 | 0.100235 | 1.006652 | 0.394993 | 4.297874 | 0.308439 | 7.500450 |
| 10 | 0.053719 | 0.785591 | 0.064981 | 0.659803 | 0.277975 | 5.958278 | 0.285020 | 6.706646 |
| 11 | 0.045122 | 0.695868 | 0.054495 | 0.591093 | 0.254106 | 6.267242 | 0.262149 | 6.087042 |
| 12 | 0.027770 | 0.329412 | 0.038710 | 0.498229 | 0.142448 | 1.141191 | 0.153597 | 2.384437 |
| 13 | 0.023046 | 0.188391 | 0.036688 | 0.498411 | 0.135588 | 1.135557 | 0.141948 | 1.883733 |
| 14 | 0.019077 | 0.183395 | 0.029845 | 0.370185 | 0.133303 | 0.892580 | 0.138097 | 1.745860 |
| 15 | 0.009084 | 0.079843 | 0.010454 | 0.072785 | 0.126483 | 1.141527 | 0.136449 | 1.690904 |
| 16 | 0.004903 | 0.047152 | 0.007470 | 0.062991 | 0.088841 | 0.674033 | 0.084316 | 0.717501 |
| 17 | 0.002854 | 0.040896 | 0.004159 | 0.039751 | 0.057153 | 0.384786 | 0.071625 | 0.756676 |
| 18 | 0.002674 | 0.041194 | 0.004042 | 0.039902 | 0.053352 | 0.462396 | 0.070258 | 0.758950 |
| 19 | 0.002563 | 0.040183 | 0.003412 | 0.041093 | 0.049251 | 0.485539 | 0.050229 | 0.467926 |
| 20 | 0.002216 | 0.039310 | 0.002388 | 0.039001 | 0.041144 | 0.456910 | 0.048174 | 0.417688 |
| 21 | 0.002194 | 0.037175 | 0.002366 | 0.039672 | 0.039678 | 0.441646 | 0.047162 | 0.401842 |
| 22 | 0.002133 | 0.037243 | 0.002295 | 0.038082 | 0.035597 | 0.385253 | 0.046510 | 0.404640 |
| 23 | 0.001731 | 0.038293 | 0.001784 | 0.039610 | 0.031366 | 0.399590 | 0.046213 | 0.407208 |
| 24 | 0.001447 | 0.033573 | 0.001351 | 0.033616 | 0.028519 | 0.367781 | 0.044626 | 0.379416 |
| 25 | 0.001411 | 0.031679 | 0.001235 | 0.030070 | 0.026519 | 0.380943 | 0.040074 | 0.396436 |
| 26 | 0.001301 | 0.022786 | 0.001136 | 0.021393 | 0.025753 | 0.342906 | 0.035044 | 0.366375 |
| 27 | 0.001215 | 0.020892 | 0.001012 | 0.016909 | 0.024975 | 0.336707 | 0.030856 | 0.315990 |
| 28 | 0.000791 | 0.016380 | 0.000704 | 0.013512 | 0.017910 | 0.257441 | 0.030325 | 0.319008 |
| 29 | 0.000676 | 0.013740 | 0.000588 | 0.010776 | 0.016680 | 0.227899 | 0.030165 | 0.311538 |
| 30 | 0.000506 | 0.007782 | 0.000398 | 0.005427 | 0.014667 | 0.246806 | 0.023990 | 0.230191 |
| 31 | 0.000361 | 0.006137 | 0.000302 | 0.004748 | 0.012939 | 0.260053 | 0.023087 | 0.278157 |
| 32 | 0.000279 | 0.004094 | 0.000209 | 0.001891 | 0.010341 | 0.140162 | 0.023156 | 0.266297 |

Entry in red denotes the first dimension when Av. $\Delta E_{94} < 1$ and max. $\Delta E_{94} < 6$.

TABLE 2

Spectral Weighting Function tabulated at 5 nm interval

| λ | $\bar{w}$ |
|---|---|
| 360 | 0.006873 |
| 365 | 0.017853 |
| 370 | 0.031852 |
| 375 | 0.057990 |
| 380 | 0.103533 |
| 385 | 0.176682 |
| 390 | 0.326798 |
| 395 | 0.602835 |
| 400 | 1.086068 |
| 405 | 1.838509 |
| 410 | 3.387320 |
| 415 | 6.059822 |
| 420 | 10.46725 |
| 425 | 16.41886 |
| 430 | 21.79528 |
| 435 | 25.46082 |
| 440 | 27.26830 |
| 445 | 27.68552 |
| 450 | 27.26877 |
| 455 | 26.44436 |
| 460 | 24.89593 |
| 465 | 22.22273 |
| 470 | 18.33106 |
| 475 | 14.36055 |
| 480 | 11.09392 |
| 485 | 8.874551 |
| 490 | 7.893052 |
| 495 | 7.884054 |
| 500 | 8.754254 |
| 505 | 10.24985 |
| 510 | 12.12888 |
| 515 | 14.15512 |
| 520 | 15.92399 |
| 525 | 17.07183 |
| 530 | 17.71384 |
| 535 | 17.96066 |
| 540 | 17.87971 |
| 545 | 17.53716 |
| 550 | 17.02559 |
| 555 | 16.43795 |
| 560 | 15.85504 |
| 565 | 15.33625 |
| 570 | 14.94969 |
| 575 | 14.72973 |
| 580 | 14.74191 |
| 585 | 14.91995 |
| 590 | 15.19525 |
| 595 | 15.48907 |

TABLE 2-continued

Spectral Weighting Function tabulated at 5 nm interval

| λ | $\bar{w}$ |
|---|---|
| 600 | 15.67053 |
| 605 | 15.65340 |
| 610 | 15.28689 |
| 615 | 14.55128 |
| 620 | 13.44628 |
| 625 | 11.99522 |
| 630 | 10.38913 |
| 635 | 8.834521 |
| 640 | 7.356508 |
| 645 | 5.971158 |
| 650 | 4.722774 |
| 655 | 3.654593 |
| 660 | 2.767215 |
| 665 | 2.038702 |
| 670 | 1.477912 |
| 675 | 1.075634 |
| 680 | 0.787774 |
| 685 | 0.558210 |
| 690 | 0.386088 |
| 695 | 0.269593 |
| 700 | 0.192536 |
| 705 | 0.137721 |
| 710 | 0.098205 |
| 715 | 0.069765 |
| 720 | 0.049246 |
| 725 | 0.034795 |
| 730 | 0.024443 |
| 735 | 0.016995 |
| 740 | 0.011734 |
| 745 | 0.008098 |
| 750 | 0.005652 |
| 755 | 0.003984 |
| 760 | 0.002822 |
| 765 | 0.001993 |
| 770 | 0.001411 |
| 775 | 0.000996 |
| 780 | 0.000705 |
| 785 | 0.000498 |
| 790 | 0.000351 |
| 795 | 0.000247 |
| 800 | 0.000174 |
| 805 | 0.000123 |
| 810 | 0.000086 |
| 815 | 0.000061 |
| 820 | 0.000043 |
| 825 | 0.000030 |
| 830 | 0.000014 |

TABLE 3

Color Difference as a function of number of spectral basis functions and illuminant, using the Spectral Weights, applied to the Munsell spectral data

| Illuminant | A | | $D_{65}$ | | $F_{11}$ | | Low Pressure Sodium | |
|---|---|---|---|---|---|---|---|---|
| Dimension | Av. $\Delta E_{94}$ | Max. $\Delta E_{94}$ | Av. $\Delta E_{94}$ | Max. $\Delta E_{94}$ | Av. $\Delta E_{94}$ | Max. $\Delta E_{94}$ | Av. $\Delta E_{94}$ | Max. $\Delta E_{94}$ |
| 1 | 17.13861 | 42.28708 | 16.83210 | 40.68895 | 17.43912 | 44.62090 | 9.558285 | 36.76955 |
| 2 | 8.760984 | 36.37906 | 9.951169 | 35.61546 | 9.659905 | 35.01122 | 2.946738 | 15.44071 |
| 3 | 1.042105 | 5.854587 | 0.390944 | 2.868782 | 1.037596 | 6.485896 | 1.420065 | 18.59656 |
| 4 | 0.542623 | 5.752907 | 0.361340 | 3.198740 | 0.728511 | 4.337215 | 1.109179 | 13.09841 |
| 5 | 0.317128 | 3.782229 | 0.255713 | 3.981239 | 0.438136 | 5.413007 | 0.587681 | 6.628057 |
| 6 | 0.285322 | 3.968719 | 0.185331 | 2.401697 | 0.331393 | 2.670922 | 0.563853 | 6.673925 |
| 7 | 0.209498 | 3.765653 | 0.155915 | 1.937965 | 0.263243 | 2.830459 | 0.277516 | 6.582500 |
| 8 | 0.165774 | 3.786627 | 0.125674 | 1.949681 | 0.175209 | 2.103753 | 0.229591 | 6.252602 |
| 9 | 0.104632 | 2.565995 | 0.091462 | 1.289131 | 0.136945 | 1.542416 | 0.150626 | 1.614747 |
| 10 | 0.092363 | 2.585544 | 0.063091 | 1.285780 | 0.107241 | 0.842787 | 0.143646 | 1.576149 |
| 11 | 0.050681 | 1.869444 | 0.040025 | 0.884359 | 0.104886 | 0.941253 | 0.120236 | 1.889723 |
| 12 | 0.042320 | 1.410105 | 0.038286 | 0.671212 | 0.063961 | 0.509984 | 0.094993 | 0.756471 |
| 13 | 0.036811 | 1.411871 | 0.020663 | 0.669459 | 0.061243 | 0.483697 | 0.083871 | 0.731280 |
| 14 | 0.029901 | 1.240094 | 0.017072 | 0.586744 | 0.042653 | 0.477833 | 0.052477 | 0.399094 |

TABLE 3-continued

Color Difference as a function of number of spectral basis functions and illuminant, using the Spectral Weights, applied to the Munsell spectral data

| Illuminant | A | | $D_{65}$ | | $F_{11}$ | | Low Pressure Sodium | |
|---|---|---|---|---|---|---|---|---|
| Dimension | Av. $\Delta E_{94}$ | Max. $\Delta E_{94}$ | Av. $\Delta E_{94}$ | Max. $\Delta E_{94}$ | Av. $\Delta E_{94}$ | Max. $\Delta E_{94}$ | Av. $\Delta E_{94}$ | Max. $\Delta E_{94}$ |
| 15 | 0.030059 | 1.231988 | 0.016038 | 0.581072 | 0.037418 | 0.428225 | 0.049425 | 0.371329 |
| 16 | 0.028856 | 1.192265 | 0.015289 | 0.560175 | 0.033986 | 0.491512 | 0.049105 | 0.364070 |
| 17 | 0.026532 | 1.028693 | 0.013377 | 0.467836 | 0.028467 | 0.211815 | 0.048593 | 0.359941 |
| 18 | 0.021672 | 0.746360 | 0.011068 | 0.339196 | 0.019449 | 0.173087 | 0.047836 | 0.362145 |
| 19 | 0.020938 | 0.704108 | 0.010545 | 0.321780 | 0.016534 | 0.213967 | 0.047357 | 0.464547 |
| 20 | 0.018685 | 0.540081 | 0.009488 | 0.247064 | 0.016211 | 0.222545 | 0.031459 | 0.260119 |
| 21 | 0.015324 | 0.387556 | 0.008303 | 0.182497 | 0.010605 | 0.146458 | 0.031262 | 0.253935 |
| 22 | 0.012388 | 0.278173 | 0.006720 | 0.126651 | 0.004468 | 0.041674 | 0.019500 | 0.186887 |
| 23 | 0.011990 | 0.272927 | 0.006188 | 0.122233 | 0.003450 | 0.038356 | 0.007261 | 0.091012 |
| 24 | 0.007164 | 0.121489 | 0.004150 | 0.052984 | 0.002689 | 0.033162 | 0.005503 | 0.037604 |
| 25 | 0.006887 | 0.118127 | 0.003909 | 0.051456 | 0.001352 | 0.009236 | 0.005285 | 0.033415 |
| 26 | 0.006729 | 0.118410 | 0.003153 | 0.051642 | 0.000850 | 0.007399 | 0.002698 | 0.035576 |
| 27 | 0.003986 | 0.057910 | 0.001878 | 0.023666 | 0.000699 | 0.008085 | 0.000440 | 0.004461 |
| 28 | 0.002255 | 0.044778 | 0.001165 | 0.016558 | 0.000548 | 0.005640 | 0.000140 | 0.000931 |
| 29 | 0.002150 | 0.044770 | 0.000846 | 0.016486 | 0.000274 | 0.005592 | 0.000070 | 0.000694 |
| 30 | 0.001297 | 0.030235 | 0.000528 | 0.012116 | 0.000171 | 0.004079 | 0.000057 | 0.000425 |
| 31 | 0.000593 | 0.012287 | 0.000253 | 0.004898 | 0.000082 | 0.001354 | 0.000055 | 0.000415 |
| 32 | 0.000223 | 0.004162 | 0.000099 | 0.001500 | 0.000042 | 0.000326 | 0.000055 | 0.000409 |

Entry in red denotes the first dimension when Av. $\Delta E_{94}$ < 1 and Max. $\Delta E_{94}$ < 6.

TABLE 4

Error statistics for the Munsell data (Matte) with 8 basis functions in both reflectances and illuminants

| Illuminant | Av. $\Delta E_{94}$ | max. $\Delta E_{94}$ | Std. Dev. |
|---|---|---|---|
| A* | 0.165058 | 3.788630 | 0.244263 |
| B | 0.134550 | 2.512361 | 0.166235 |
| C | 0.126416 | 1.959394 | 0.138216 |
| D50* | 0.129941 | 2.447921 | 0.163143 |
| D55 | 0.127552 | 2.240340 | 0.151976 |
| D65 | 0.126291 | 1.938091 | 0.137307 |
| D75 | 0.127265 | 1.737589 | 0.129139 |
| F1 | 0.081333 | 0.851282 | 0.070593 |
| F2* | 0.073136 | 0.828812 | 0.065176 |
| F3 | 0.071603 | 0.837708 | 0.062689 |
| F4 | 0.074966 | 0.848084 | 0.061291 |
| F5 | 0.082742 | 0.832561 | 0.072562 |
| F6 | 0.075386 | 0.815077 | 0.067628 |
| F7* | 0.103225 | 1.289527 | 0.107676 |
| F8 | 0.115797 | 1.849653 | 0.136847 |
| F9 | 0.114262 | 1.788778 | 0.136680 |
| F10 | 0.168138 | 2.005240 | 0.149205 |
| F11* | 0.175619 | 2.103753 | 0.162584 |
| F12 | 0.205519 | 2.078751 | 0.176880 |
| Low Pressure Sodium* | 0.229375 | 6.253937 | 0.397843 |
| High Pressure Sodium | 0.214846 | 1.039705 | 0.131858 |
| Mercury MB* | 0.247059 | 2.405222 | 0.231538 |
| Mercury MBF | 0.207207 | 1.664215 | 0.157485 |
| Mercury MBTF | 0.184096 | 1.494777 | 0.143259 |
| Mercury HMI | 0.169381 | 1.730396 | 0.137234 |
| Xenon* | 0.145889 | 2.276520 | 0.156242 |

*Exact illuminant

What is claimed is:

1. A method of generating a weighting function for an optical sensor, the method comprising:

inputting a first weighting function, which is based on a transformation of a reflectance perturbation from a reflectance space into a color space of the sensor;

calculating the first weighting function with a plurality of predetermined stimuli to obtain a corresponding plurality of resulting functions; and averaging the resulting functions to obtain the weighting function for the sensor, wherein the reflectance perturbation is a perturbation of a reflectance vector of a stimulus in the reflectance space, and the first weighting function is based on (i) transforming the perturbation into the color space of the sensor, the transformed perturbation corresponding to a color difference between an unperturbed reflectance vector transformed into the color space and a perturbed reflectance vector transformed into the color space, and (ii) taking the limit of the transformed perturbation as the perturbation approaches zero.

2. A method according to claim 1, wherein the transformation of the reflectance perturbation is based on a spectrally flat illuminant.

3. A method according to claim 1, wherein the transformation of the reflection perturbation into the color space of the sensor comprises:

calculating tristimulus values of the reflectance perturbation; and transforming the tristimulus values into a linear color space of the sensor.

4. A method according to claim 1, further comprising:

constructing the predetermined stimuli by sampling the color space of the sensor under a spectrally flat illuminant, within a gamut of the sensor.

5. An apparatus for generating a weighting function for an optical sensor, the apparatus comprising:

a processor that executes computer-executable process steps; and a memory that stores computer-executable process steps to be executed by the processor, the computer-executable process steps executable to input a first weighting function, which is based on a transformation of a reflectance perturbation from a reflectance space into a color space of the sensor, to calculate the first weighting function with a plurality of predetermined stimuli to obtain a corresponding plurality of resulting functions, and to average the resulting functions to obtain the weighting function for the sensor, wherein the reflectance perturbation is a perturbation of a reflectance vector of a stimulus in the reflectance space, and the first weighting function is based on (i) transforming the perturbation into the color space of the sensor, the transformed perturbation corresponding to a color difference between an unperturbed reflectance vector transformed into the color space and a perturbed reflectance vector transformed into the color space, and (ii) taking the limit of the transformed perturbation as the perturbation approaches zero.

6. An apparatus according to claim 5, wherein the transformation of the reflectance perturbation is based on a spectrally flat illuminant.

7. An apparatus according to claim 5, wherein the transformation of the reflectance perturbation into the color space of the sensor comprises:
   calculating tristimulus values of the reflectance perturbation; and
   transforming the tristimulus values into a linear color space of the sensor.

8. An apparatus according to claim 5, the method performed by the computer-executable process steps further comprising:
   constructing the predetermined stimuli by sampling the color space of the sensor under a spectrally flat illuminant, within a gamut of the sensor.

9. A non-transitory computer-readable storage medium on which is stored an optical sensor weighting function for construction of basis functions, the weighting function generated by a method comprising:
   inputting a first weighting function, which is based on a transformation of a reflectance perturbation from a reflectance space into a color space of the sensor;
   calculating the first weighting function with a plurality of predetermined stimuli to obtain a corresponding plurality of resulting functions; and
   averaging the resulting functions to obtain the weighting function for the sensor,
   wherein the reflectance perturbation is a perturbation of a reflectance vector of a stimulus in the reflectance space, and the first weighting function is based on (i) transforming the perturbation into the color space of the sensor, the transformed perturbation corresponding to a color difference between an unperturbed reflectance vector transformed into the color space and a perturbed reflectance vector transformed into the color space, and (ii) taking the limit of the transformed perturbation as the perturbation approaches zero.

10. A non-transitory computer-readable storage medium according to claim 9, wherein the transformation of the reflectance perturbation is based on a spectrally flat illuminant.

11. A non-transitory computer-readable storage medium according to claim 9, wherein the transformation of the reflection perturbation into the color space of the sensor comprises:
    calculating tristimulus values of the reflectance perturbation; and transforming the tristimulus values into a linear color space of the sensor.

12. A non-transitory computer-readable storage medium according to claim 9, the method of generating the weighting function further comprising:
    constructing the predetermined stimuli by sampling the color space of the sensor under a spectrally flat illuminant, within a gamut of the sensor.

* * * * *